United States Patent
Sundström et al.

(10) Patent No.: US 10,994,225 B2
(45) Date of Patent: May 4, 2021

(54) TANK FOR HOLDING CONTENTS WHICH CAN SEPARATE INTO DIFFERENT PHASES

(71) Applicant: ROCCO Slop AB, Östersund (SE)

(72) Inventors: Fred Sundström, Östersund (SE); Mikael Jönsson, Östersund (SE); Thomas Persson, Östersund (SE)

(73) Assignee: Rocco Slop AB, Östersund (SE)

( * ) Notice: Subject to any disclaimer, the term of this patent is extended or adjusted under 35 U.S.C. 154(b) by 0 days.

(21) Appl. No.: 16/342,632

(22) PCT Filed: Oct. 13, 2017

(86) PCT No.: PCT/SE2017/051010
§ 371 (c)(1),
(2) Date: Apr. 17, 2019

(87) PCT Pub. No.: WO2018/074966
PCT Pub. Date: Apr. 26, 2018

(65) Prior Publication Data
US 2020/0054968 A1 Feb. 20, 2020

(30) Foreign Application Priority Data

Oct. 18, 2016 (SE) .................................. 1651361-6

(51) Int. Cl.
*B01D 17/02* (2006.01)
*B01D 17/12* (2006.01)

(52) U.S. Cl.
CPC ......... *B01D 17/0214* (2013.01); *B01D 17/12* (2013.01)

(58) Field of Classification Search
CPC . B01D 17/0214; B01D 17/12; B01D 17/0208
See application file for complete search history.

(56) References Cited

U.S. PATENT DOCUMENTS

| | | | |
|---|---|---|---|
| 1,663,651 A | | 3/1928 | Green |
| 2,625,175 A | * | 1/1953 | Wilson ............... B01D 17/0214 137/577 |
| 2,872,935 A | * | 2/1959 | Kenney ............. B01D 17/0214 137/172 |
| 4,014,786 A | | 3/1977 | Potter et al. |
| 4,145,287 A | * | 3/1979 | Walker .................. B01D 17/12 210/104 |
| 5,149,344 A | * | 9/1992 | Macy ................. B01D 19/0042 96/159 |
| 5,837,152 A | * | 11/1998 | Komistek ............. B01D 17/00 210/801 |
| 2010/0230347 A1 | * | 9/2010 | Haslem ............. B01D 17/0208 210/523 |
| 2013/0334142 A1 | | 12/2013 | Janjua |
| 2014/0104098 A1 | * | 4/2014 | Linden .................. G01F 23/284 342/124 |
| 2016/0121238 A1 | * | 5/2016 | Mills .................. B01D 17/0214 210/744 |

FOREIGN PATENT DOCUMENTS

CN        201643785 U    11/2010

* cited by examiner

*Primary Examiner* — Terry K Cecil
(74) *Attorney, Agent, or Firm* — Dilworth & Barrese, LLP

(57) ABSTRACT

Tank for holding contents which can separate into different phases, said tank comprising at least two outlet pipes each provided through a bottom of the tank with a first end of the outlet pipes provided outside the tank and a second end provided inside the tank, the second ends of the at least two outlet pipes being provided at different heights within the tank.

10 Claims, 3 Drawing Sheets

TANK FOR HOLDING CONTENTS WHICH CAN SEPARATE INTO DIFFERENT PHASES

TECHNICAL FIELD OF THE INVENTION

The present invention relates to a tank for holding contents which can separate into different phases.

BACKGROUND OF THE INVENTION

Purification of oils, such as for example slop oil and waste oil is important for the possibility to reuse oils and therefore an important factor for the environmental future and the limited nature resources of oils. Purification of slop oil is problematic in many ways. Slop oil can comprise oil, water, particles and emulsions. Purification of industrial emulsions comprising water and oil, such as for example cutting fluids is also an important environmental issue. Other examples of oils which might need to be purified after use are industrial oils, motor oils and marine oils. During a purification process the fluids described above will often separate into different phases, often an oil phase and a water phase and/or possibly a sludge phase. Storage tanks can be used as parts of purification systems for purification of for example slop oil, emulsions of oil and water or other fluids which can separate into different phases.

SUMMARY

An object of the present invention is to provide an improved tank for holding contents which can separate into different phases.

This is achieved in a tank according to the description herein.

A tank for holding contents which can separate into different phases is provided. Said tank being a metallic or plastic tank and comprises at least two outlet pipes each provided through a bottom of the tank with a first end of the outlet pipes provided outside the tank and a second end provided inside the tank, the second ends of the at least two outlet pipes being provided at different heights within the tank.

Hereby, since the outlet pipes are provided on the inside of the tank instead of outside the tank and through the bottom instead of through a mantel surface of the tank, heat is better preserved. Heat may assist in separation of the content into different phases. With the tank according to the invention content can be taken out from different levels within the tank by use of the outlet pipes at different levels. Hereby one of the phases can be taken out while keeping the other inside the tank.

In one embodiment of the invention the content is slop oil, industrial emulsions or industrial oils.

In one embodiment of the invention the tank further comprises at least one sensor arranged for detecting an interface between two phases of the content in the tank. Hereby the level in the tank where an interface between two phases of the content in the tank can be detected and the outtake of content through the outlet pipes can be based on this information, i.e., which outlet pipe to use for retrieving a certain phase of the content.

In one embodiment of the invention the sensor is a guided wave radar and can detect an interface between water and oil.

In one embodiment of the invention the tank further comprises a control system arranged to control an outtake of content from the tank through the at least two outlet pipes in dependence of output from the sensor.

In one embodiment of the invention the tank further comprises at least one content filling pipe comprising a perforated pipe perforated with holes along its length, said perforated pipe being provided on the inside of the tank along substantially the whole length of the tank. Hereby content to be filled into the tank can be provided smoothly, i.e. without mixing content already provided in the tank.

In one embodiment of the invention the content filling pipe further comprises a connection pipe connected to an open top end of the perforated pipe and provided through the bottom of the tank and inside the tank.

In one embodiment of the invention the tank further comprises heating means provided to the tank for heating the content. By heating the content separation into phases can be speeded up.

DETAILED DESCRIPTION OF THE EMBODIMENTS

Figure 1A:
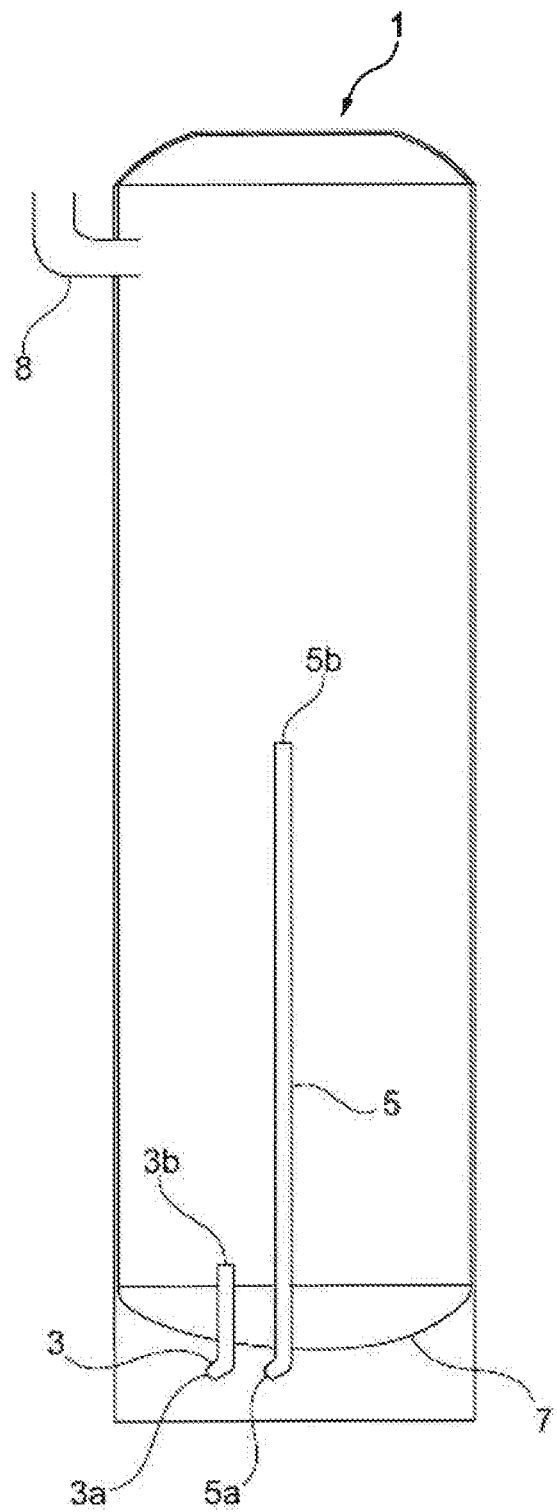
FIG. 1a shows schematically a cross section of a tank according to one embodiment of the invention.

FIG. 1a shows schematically a cross section of a tank 1 according to one embodiment of the invention. The tank is a tank for holding contents which can separate into different phases. The phases can be for example oil and water and the content can be for example waste oil, slop oil or industrial emulsions, such as cutting fluids. The tank 1 comprises in this embodiment two outlet pipes, a first outlet pipe 3 and a second outlet pipe 5. However the number of outlet pipes can vary. According to the invention there are at least two outlet pipes provided. Each outlet pipe 3, 5 is provided through a bottom 7 of the tank 1 with a first open end 3a, 5a outside the tank land a second open end 3b, 5b inside the tank. The second open ends 3b, 5b of the two outlet pipes 3, 5 are provided at different heights within the tank 1. In this embodiment the second open end 3b of the first outlet pipe 3 is provided directly above the bottom 7 of the tank 1. Hereby a content in the tank which is provided in a lower part of the tank can be taken out through this first outlet pipe 3. If the content of the tank has been separated into different phases, the phase which will settle in the lowermost part of the tank can be taken out through the first outlet pipe 3. The second open end 5b of the second outlet pipe 5 is in this embodiment provided at a higher level within the tank 1. In this shown embodiment the second open end 5a of the second outlet pipe 5 ends slightly above the middle height of the tank 1. Hereby another phase of the content of the tank can be taken out through the second outlet pipe without affecting the rest of the content in the tank. More than two outlet pipes can of course be provided to the tank.

The outlet pipes 3, 5 are provided inside the tank 1 instead of outside the tank in order to preserve heat. An alternative would be to provide outlets through a mantel surface of the tank at different heights. However with such a method heat would be lost both through the outlets in the mantel surface, because the mantel surface is often insulated, and through additional pipes provided outside the tank and connected to the outlets. An inlet 8 to the tank is here shown in the upper part of the tank but could also be provided in another part of the tank. The tank 1 according to the invention is suitable for holding contents which can separate into different phases such as oil and water. Preserving of heat is an important factor for the separation process. Hereby the tank according to the invention is made from a suitable heat preserving material, such as a metal or a heat resistant plastic. Examples of suitable materials are for example carbon steel or stainless steel. Furthermore, the tank is in some embodiments of the invention provided with an insulating layer for improving heat preserving. Insulation can be provided for example as a layer of glass fiber outside the metallic tank surface and possibly covered by another metallic shield. Another alternative would be to provide the tank with a double metallic surface and spray insulation material, for example polyurethane foam, into a space between the two surfaces.

Figure 1B:
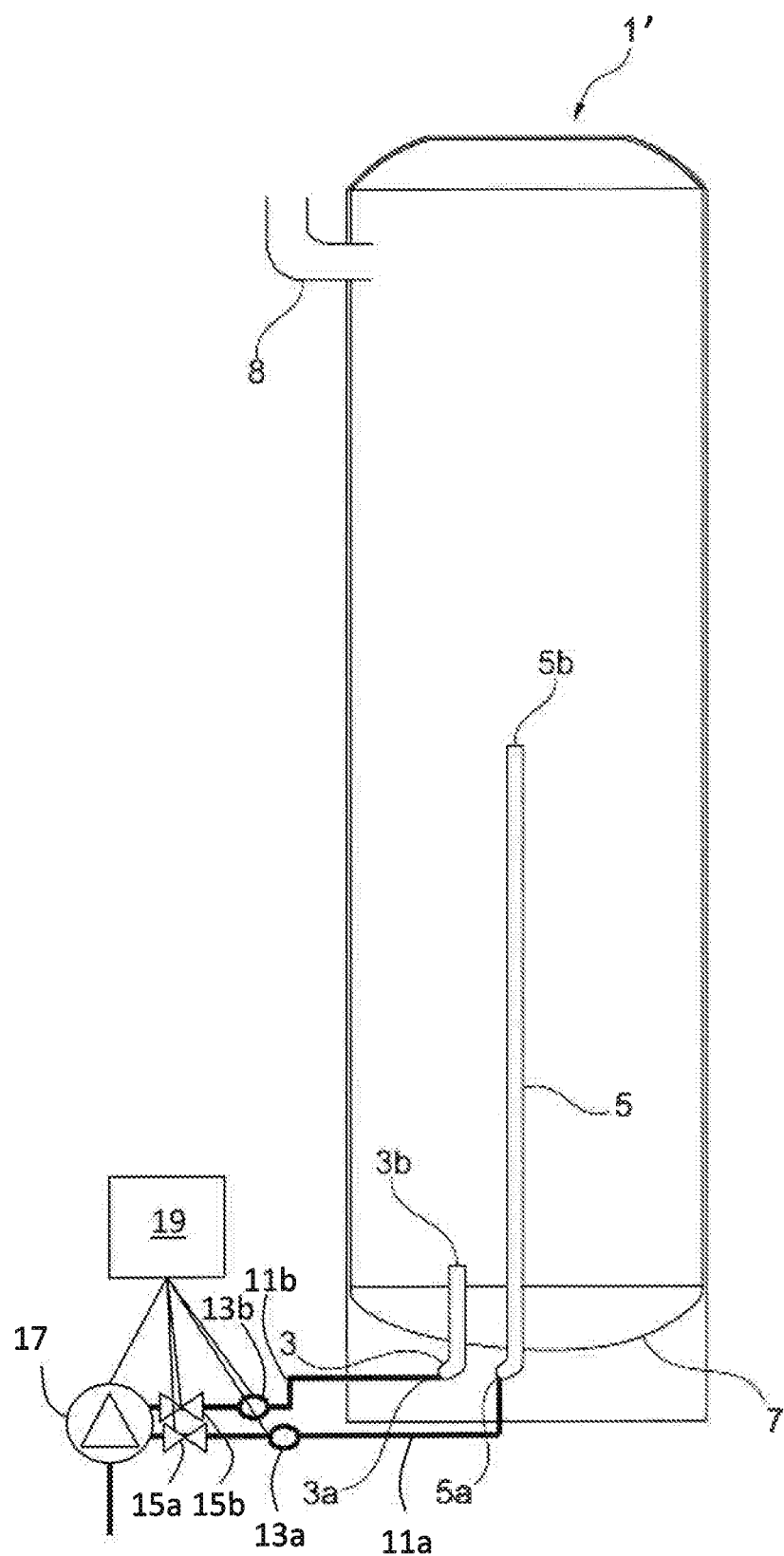
FIG. 1b shows schematically a cross section of a tank according to one embodiment of the invention.

FIG. 1b shows schematically a cross section of a tank 1' according to another embodiment of the invention. All the parts provided in the embodiment as described in relation to FIG. 1a are present also in this embodiment and are also given the same numbering. In this embodiment however connection pipes 11a, 11b are shown connected one to each outlet pipe 3, 5. In this embodiment of the invention one sensor 13a, 13b is provided in each of the connection pipes 11a, 11b. Alternatively only one sensor is provided in one of the connection pipes 11a, 11b. Furthermore valves 15a, 15b are suitably provided in the connection pipes 11a, 11b and the connection pipes are connected to a pump 17. Furthermore a control system 19 is shown in this embodiment. The control system 19 is connected to the sensors 13a, 13b, the valves 15a, 15b and the pump 17. The sensors can for example measure dielectric properties or density properties of the content passing the sensors. The control system 19 can use the output from the sensors to identify the content and for controlling the valves and the pump such that a wanted phase of the content in the tank can be removed from the tank.

In a transparent tank it would be possible to identify a level of an interphase between different phases within the tank from outside the tank by use of the eyes or another optical device. However, in the tanks according to the invention where a metallic material or a heat resistant plastic is used and which also possibly are insulated for improving heat preservation it is more difficult to identify a level of an interphase between different phases within the tank. According to this invention sensors can be used for the identification of different phases in the tank. Either sensors can be provided outside the tank as described in relation to FIG. 1b or inside the tank as will be described in relation to FIG. 2.

Figure 2:
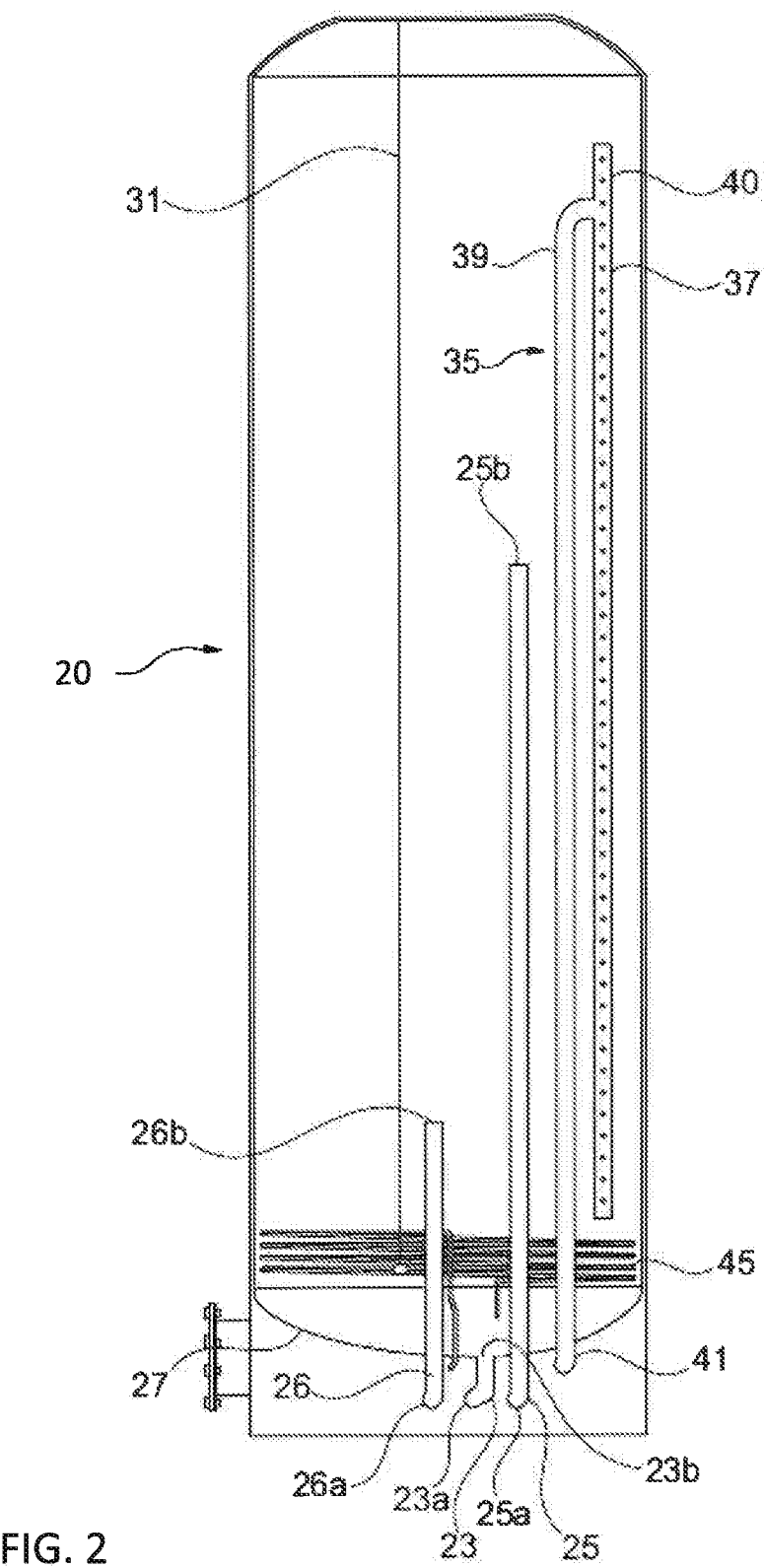
FIG. 2 shows schematically a cross section of a tank according to another embodiment of the invention.

FIG. 2 shows schematically a cross section of a tank 20 according to another embodiment of the invention. In this embodiment three outlet pipes are provided, a first outlet pipe 23, a second outlet pipe 25 and a third outlet pipe 26. Each outlet pipe 23, 25, 26 is provided through a bottom 27 of the tank 20 with a first open end 23a, 25a, 26a outside the tank 20 and a second open end 23b, 25b, 26b inside the tank. The second open ends 23b, 25b, 26b of the three outlet pipes 23, 25, 26 are provided at different heights within the tank 20. In this embodiment the second open end 23b of the first outlet pipe 23 is provided at the bottom 27 of the tank 20. The second open end 25b of the second outlet pipe 23 is in this embodiment provided at a higher level inside the tank, here approximately around the middle height of the tank. The second open end 26b of the third outlet pipe 26 is in this embodiment provided at a height in between the other two second open ends 23b, 25b. Hereby, in this embodiment content can be taken out from three different levels in the tank 20. As discussed above this can be advantageous when a content in the tank has been separated into different phases and one of the phases should be taken out.

In this embodiment there is also provided a sensor 31 in the tank 20. The sensor 31 is arranged for detecting an interface between two phases of the content in the tank 20. The sensor could for example be a guided wave radar, which is a long wire attached to the top of the tank, hanging inside the tank almost all the way down to the bottom of the tank. Such a guided wave radar can provide information about where an interface between two phases are located by comparing reflected microwave pulses which will differ when the wire is provided in different environments. Another alternative would be to provide a number of sensors along the tank inside wall and compare output from these sensors to identify where an interface between phases is. Such sensors could be based on measuring dielectric properties or density properties of the content. The sensor 31 can in one embodiment of the invention detect for example an interface between water and oil.

Furthermore an output from the sensor can be used for choosing which outlet pipe to use for taking out a wanted phase of the content in the tank.

Furthermore a control system could be provided connected to the tank and arranged to control an outtake of content from the tank through the at least two outlet pipes in dependence of output from the sensor. Hereby an automated control of the outtake from the tank which is dependent on the sensor output could be provided.

In the embodiment shown in FIG. 2 the tank 20 comprises further a content filling pipe 35 comprising a perforated pipe 37 perforated with holes along its length. The perforated pipe 37 is provided on the inside of the tank 20 along substantially the whole length of the tank 20. Content to be filled into the tank 20 is then provided to the top of the perforated pipe 37 for being smoothly provided into the tank 20 through the perforations. For this purpose the content filling pipe in this embodiment further comprises a connection pipe 39 connected close to an open top end 40 of the perforated pipe 37 and provided through the bottom 27 of the tank 20 and inside the tank 20. Content to be filled into the tank is then provided to the perforated pipe 37 through the connection pipe 39 from an open end 41 of the connection pipe 39 provided pointing out through the bottom 27 of the tank 20. With this solution new content added to the tank will flow out from the perforated holes in the perforated pipe 37 smoothly and most of the content will flow out from holes provided just above the present level of the content in the tank. Hereby splashing and mixing while providing new content to the tank is avoided.

A heating means 45 is also shown in this embodiment of the invention. Heating of the tank and its content is often wanted for example for speeding up separation of content into different phases. In this embodiment a heating tube is shown coiled around the bottom part of the tank. The heating tube is connected to a water supply and can be provided with hot water for providing heat to the tank. Other heating means 45 are of course possible.

More than three outlet pipes can of course be provided in the tank.

Also in this embodiment connection pipes could be connected to the outlet pipes 23, 25, 26 as described in the embodiment shown in FIG. 1b. Sensors and valves could be provided to one or more of these connection pipes which furthermore are connected to one or more pumps. A control system can hereby control the outtake from the outlet pipes 23, 25, 26 in dependence of sensor output as described above.

The invention claimed is:

1. A tank (1;1';20) for holding contents which can separate into different phases, said tank having at least one side wall between an opposed top and bottom thereof, being a metallic or a plastic tank and comprising:
   at least two outlet pipes (3, 5; 23, 25, 26) each provided through the bottom of the tank with a first end (3a, 5a; 23a, 25a, 26a) of the outlet pipes provided outside the tank and a second end (3b, 5b; 23b, 25b, 26b) provided inside the tank, the second ends of the at least two outlet pipes being provided at different heights within the tank,
   at least one content filling pipe (35) comprising a perforated pipe (37) perforated with holes along its length, said perforated pipe being provided on the inside of the tank along substantially the whole length of the tank in a direction extending between the opposed top and bottom,
   the content filling pipe further comprises a connection pipe (39) extending substantially in said direction, connected close to an open top end (40) of the perforated pipe (37) and provided through the bottom of the tank and inside the tank, and
   a heater (45) provided in the tank for heating the content.

2. A tank according to claim 1, wherein the content is slop oil, industrial emulsions or industrial oils.

3. A tank according to claim 1, further comprising:
   at least one sensor (31) arranged for detecting an interface between two phases of the content in the tank.

4. A tank according to claim 3, wherein the sensor is a guided wave radar and can detect an interface between water and oil.

5. A tank according to claim 3, further comprising a control system (19) arranged to control an outtake of content from the tank through the at least two outlet pipes in dependence of output from the at least one sensor.

6. A tank according to claim 1, wherein said tank further comprises connection pipes (11a, 11b) connected to the outlet pipes (3, 5), and at least one of said connection pipes (11a, 11b) comprises a sensor (13a, 13b).

7. A tank according to claim 1, further comprising a layer of insulation around the tank.

8. A tank according to claim 1, wherein the heater (45) is a tube coiled around the bottom part of the tank (20).

9. A tank according to claim 1, additionally comprising a third outlet pipe (26), with said first respective ends (23a, 25a, 26a) of all said three outlet pipes (23, 25, 26) provided outside the tank, said second respective ends (23b, 25b, 26b) of all said three outlet pipes (23, 25, 26) provided inside the tank, and said second respective ends (23b, 25b, 26b) of all said three outlet pipes (23, 25, 26) being provided at different heights within the tank from one another.

10. A tank according to claim 1, wherein said pipes (23, 25) are oriented vertically inside said tank and said first respective ends (3a, 5a; 23a, 25a, 26a) of said outlet pipes (23, 25) each extending vertically through the bottom (7) of said tank.

* * * * *